US012600849B2

(12) United States Patent
Yoon et al.

(10) Patent No.:  US 12,600,849 B2
(45) Date of Patent:     Apr. 14, 2026

(54) SUPER ABSORBENT POLYMER FILM AND PREPARATION METHOD THEREOF

(71) Applicant: LG Chem, Ltd., Seoul (KR)

(72) Inventors: Kiyoul Yoon, Daejeon (KR); Hyosook Joo, Daejeon (KR); Seongkyun Kang, Daejeon (KR); Yu Jin Kim, Daejeon (KR); Gicheul Kim, Daejeon (KR); Hyeon Choi, Daejeon (KR)

(73) Assignee: LG Chem, Ltd., Seoul (KR)

( * ) Notice: Subject to any disclaimer, the term of this patent is extended or adjusted under 35 U.S.C. 154(b) by 703 days.

(21) Appl. No.: 17/795,359

(22) PCT Filed: Mar. 23, 2021

(86) PCT No.: PCT/KR2021/003544
§ 371 (c)(1),
(2) Date: Jul. 26, 2022

(87) PCT Pub. No.: WO2021/194201
PCT Pub. Date: Sep. 30, 2021

(65) Prior Publication Data
US 2023/0107670 A1     Apr. 6, 2023

(30) Foreign Application Priority Data

Mar. 23, 2020   (KR) ........................ 10-2020-0035145
Mar. 22, 2021   (KR) ........................ 10-2021-0036937

(51) Int. Cl.
*C08L 33/08*          (2006.01)
*C08J 5/18*           (2006.01)

(52) U.S. Cl.
CPC ................. *C08L 33/08* (2013.01); *C08J 5/18* (2013.01); *C08J 2300/14* (2013.01); *C08J 2333/00* (2013.01)

(58) Field of Classification Search
CPC ...................................................... C08L 33/02
See application file for complete search history.

(56) References Cited

U.S. PATENT DOCUMENTS

| | | | | |
|---|---|---|---|---|
| 5,087,513 A * | 2/1992 | Kim | ........................ | B01D 71/62 |
| | | | | 442/361 |
| 6,096,014 A | 8/2000 | Haffner et al. | | |
| 6,686,414 B1 * | 2/2004 | Anderson | ................. | C08F 8/44 |
| | | | | 524/556 |
| 6,852,813 B2 | 2/2005 | Darlington, Jr. et al. | | |
| 9,950,308 B2 * | 4/2018 | Lee | ........................ | B01J 20/267 |
| 2003/0134102 A1 | 7/2003 | Wang et al. | | |
| 2004/0110914 A1 | 6/2004 | Nakahara et al. | | |
| 2004/0116287 A1 | 6/2004 | Wang et al. | | |
| 2005/0031852 A1 * | 2/2005 | Schmidt | ..................... | C08J 3/12 |
| | | | | 428/407 |
| 2005/0137085 A1 * | 6/2005 | Zhang | ................... | A61F 13/531 |
| | | | | 502/402 |

| | | | | |
|---|---|---|---|---|
| 2005/0256758 A1 * | 11/2005 | Sierra | ..................... | A61F 13/53 |
| | | | | 604/378 |
| 2007/0088106 A1 | 4/2007 | Schlesiger et al. | | |
| 2008/0058747 A1 * | 3/2008 | Singh Kainth | ......... | A61L 15/26 |
| | | | | 604/372 |
| 2010/0100066 A1 | 4/2010 | Azad et al. | | |
| 2010/0294988 A1 * | 11/2010 | Stueven | .................... | C08F 2/00 |
| | | | | 252/194 |
| 2011/0012057 A1 * | 1/2011 | Lindner | .................. | A61L 15/60 |
| | | | | 427/213 |
| 2011/0172507 A1 * | 7/2011 | Lademann | .............. | A61L 15/56 |
| | | | | 604/372 |
| 2011/0301027 A1 | 12/2011 | Bitis et al. | | |
| 2012/0157623 A1 * | 6/2012 | Lindner | .................. | A61L 15/60 |
| | | | | 524/790 |
| 2012/0271260 A1 | 10/2012 | Azad et al. | | |
| 2012/0309890 A1 * | 12/2012 | Haberle | ................... | C08J 3/245 |
| | | | | 427/213 |
| 2013/0175472 A1 * | 7/2013 | Tian | ..................... | C08F 230/085 |
| | | | | 252/194 |
| 2014/0127510 A1 | 5/2014 | Handa et al. | | |
| 2014/0242371 A1 | 8/2014 | Hatanaka et al. | | |
| 2014/0276513 A1 * | 9/2014 | MacDonald | ........... | D06N 3/042 |
| | | | | 428/221 |

(Continued)

FOREIGN PATENT DOCUMENTS

| | | |
|---|---|---|
| CN | 101243131 A | 9/2011 |
| CN | 102186508 A | 9/2011 |

(Continued)

OTHER PUBLICATIONS

Extended European Search Report including Written Opinion for Application No. 21775421.7 dated May 19, 2023, pp. 1-10.
International Search Report for PCT/KR2021/003544 dated Jul. 2, 2021. 5 pgs.
Odian, George, "Principles of polymerization", 2nd ed., Wiley-Interscience New York, Oct. 1981.3 pgs.
Schwalm, Reinhold, "UV Coatings: Basics, Recent Developments and New Applications", Elsevier Science (Dec. 2006). 3 pgs.
Britannica, The Editors of Encyclopaedia. "strength of materials". Encyclopedia Britannca, Oct. 7, 2022, <https://www.britannica.com/technology/strength-of-materials.> (Year: 2022).

(Continued)

*Primary Examiner* — Liam J Heincer
(74) *Attorney, Agent, or Firm* — Lerner David LLP

(57)        ABSTRACT

The present disclosure relates to a super absorbent polymer film and a preparation method of the same. Specifically, it relates to a new type of super absorbent polymer film, which is thin and exhibits excellent absorption performance, flexibility and elasticity while having little change in the shape of products. In addition, the super absorbent polymer film of the present disclosure is free from scattering or leaking, and does not require an auxiliary substance such as pulp, so that products can be made thinner and the manufacturing process and costs may be reduced.

15 Claims, No Drawings

(56)             References Cited

U.S. PATENT DOCUMENTS

| | | | | | |
|---|---|---|---|---|---|
| 2015/0252130 | A1* | 9/2015 | Loick | A61L 15/225 | |
| | | | | 525/344 | |
| 2015/0314034 | A1 | 11/2015 | Horner et al. | | |
| 2016/0367717 | A1* | 12/2016 | Hinayama | C08F 120/06 | |
| 2017/0281422 | A1* | 10/2017 | Herfert | A61F 13/534 | |
| 2018/0265646 | A1 | 9/2018 | Nam et al. | | |
| 2018/0305523 | A1* | 10/2018 | Kamphus | C08J 3/203 | |
| 2019/0099739 | A1* | 4/2019 | Lee | C08F 20/06 | |
| 2020/0002445 | A1 | 1/2020 | Chiba et al. | | |
| 2020/0023625 | A1* | 1/2020 | Torii | A61L 15/24 | |
| 2020/0164345 | A1* | 5/2020 | Yoon | B01J 20/3085 | |
| 2020/0270403 | A1 | 8/2020 | Nam et al. | | |
| 2020/0384441 | A1* | 12/2020 | Yoon | C08F 220/06 | |
| 2020/0398251 | A1* | 12/2020 | Choi | B29B 9/02 | |
| 2021/0022932 | A1* | 1/2021 | Ito | A61F 13/531 | |
| 2021/0147640 | A1* | 5/2021 | Hur | A61L 15/60 | |
| 2021/0179790 | A1 | 6/2021 | Lee et al. | | |
| 2022/0023114 | A1* | 1/2022 | Ito | C08J 3/075 | |
| 2022/0362743 | A1 | 11/2022 | Yoon et al. | | |
| 2023/0067846 | A1* | 3/2023 | Yoon | B29C 41/46 | |
| 2023/0071674 | A1* | 3/2023 | Yoon | C08J 3/243 | |
| 2023/0225916 | A1* | 7/2023 | Yoon | A61F 13/51476 | |
| | | | | 604/368 | |
| 2023/0249155 | A1* | 8/2023 | Min | B01J 20/3007 | |
| 2024/0091075 | A1* | 3/2024 | Yoon | A61F 13/49 | |

FOREIGN PATENT DOCUMENTS

| | | | |
|---|---|---|---|
| CN | 105408365 | A | 3/2016 |
| CN | 107429035 | A | 12/2017 |
| CN | 107964077 | A | 4/2018 |
| CN | 110325273 | A | 10/2019 |
| CN | 110423308 | A | 11/2019 |
| EP | 3708608 | A1 | 9/2020 |
| EP | 4074762 | A1 | 10/2022 |
| EP | 4074763 | A1 | 10/2022 |
| EP | 4074764 | A1 | 10/2022 |
| JP | H0791397 | B2 | 10/1995 |
| JP | H08073507 | A | 3/1996 |
| JP | H09183856 | A | 7/1997 |
| JP | H10018125 | A | 1/1998 |
| JP | H10076589 | A | 3/1998 |
| JP | 2001278998 | A | 10/2001 |
| JP | 2003221783 | A | 8/2003 |
| JP | 2004536626 | A | 12/2004 |
| JP | 3620866 | B2 | 2/2005 |
| JP | 3632803 | B2 | 3/2005 |
| JP | 2006016719 | A | 1/2006 |
| JP | 2006131767 | A | 5/2006 |
| JP | 2010185029 | A | 8/2010 |
| JP | 2010241975 | A | 10/2010 |
| JP | 4721780 | B2 | 7/2011 |
| JP | 2013049868 | A | 3/2013 |
| JP | 2016508167 | A | 3/2016 |
| JP | 2018030308 | A | 3/2018 |
| KR | 20000069741 | A | 11/2000 |
| KR | 2001-0033740 | A | 4/2001 |
| KR | 20010102350 | A | 11/2001 |
| KR | 20040070245 | A | 8/2004 |
| KR | 20080034470 | A | 4/2008 |
| KR | 20140056225 | A | 5/2014 |
| KR | 101448225 | B1 | 10/2014 |
| KR | 20160062900 | A | 6/2016 |
| KR | 101647166 | B1 | 8/2016 |
| KR | 20170005628 | A | 1/2017 |
| KR | 101832549 | B1 | 2/2018 |
| KR | 20180074384 | A | 7/2018 |
| KR | 20190020911 | A | 3/2019 |
| KR | 20190071619 | A | 6/2019 |
| KR | 20190088830 | A | 7/2019 |
| KR | 20200004663 | A | 1/2020 |
| KR | 20200041644 | A | 4/2020 |
| WO | 9933654 | A1 | 7/1999 |
| WO | 0050096 | A1 | 8/2000 |
| WO | 2002078756 | A1 | 10/2002 |
| WO | 2018037816 | A1 | 3/2018 |
| WO | 2018159803 | A1 | 9/2018 |

OTHER PUBLICATIONS

Extended European Search Report including Written Opinion for Application No. 21776780.5 dated Dec. 22, 2022, pp. 1-10.
Extended European Search Report including Written Opinion for Application No. 21777103.9 dated May 22, 23, pp. 1-8.
International Search Report for Application No. PCT/KR2021/003545 mailed Jul. 2, 2021, pp. 1-5.
International Search Report for Application No. PCT/KR2021/003546 mailed Jul. 8, 2021, 4 pages.
Psgtechs Coe Indutech, "Harmonized Test Methods Nonwovens and Related Industries" (Year: 2019).

* cited by examiner

SUPER ABSORBENT POLYMER FILM AND PREPARATION METHOD THEREOF

CROSS-REFERENCE TO RELATED APPLICATION(S)

The present application is a national stage entry under 35 U.S.C. § 371 of International Application No. PCT/KR2021/003544 filed on Mar. 23, 2021, which claims priority from Korean Patent Applications No. 10-2020-0035145 filed on Mar. 23, 2020, and No. 10-2021-0036937 filed on Mar. 22, 2021, all the disclosures of which are incorporated herein by reference.

TECHNICAL FIELD

The present disclosure relates to a super absorbent polymer film and a preparation method of the same.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultices, or the like.

In general, hygiene products such as various diapers, sanitary napkins, or pads for urinary incontinence include an absorber containing super absorbent polymer particles. It was common that the absorber mainly includes the super absorbent polymer particles and fluff pulp to properly fasten the super absorbent polymer particles while maintaining the shape of the absorber and hygiene products.

However, due to the presence of the fluff pulp, it was difficult to make the absorber and hygiene products slim and thin, and there was a problem such as poor wearability in which wearer's skin against the hygiene product becomes sweaty. Moreover, since the fluff pulp is mainly obtained from wood as a raw material, it has been contrary to the recent environmental protection trend, and the use of the fluff pulp has become one of the main reasons of increasing manufacturing costs of sanitary products.

In addition, current super absorbent polymers are mostly manufactured and used in the form of powder. This powder-type super absorbent polymer has limitation in the range of use and thinning, because it may be scattered or leaked when manufacturing sanitary materials or in actual use and should be used with a specific type of substrate. Further, since absorption performance of the absorber may vary depending on the content distribution of the super absorbent polymer particles, it is difficult to uniformly control the absorption characteristics.

Meanwhile, in order to solve the above problems, a sheet-type super absorbent polymer has been proposed.

For example, a method for preparing a sheet-type super absorbent polymer by kneading an acrylic acid-based monomer or pulverizing a hydrogel polymer obtained after polymerization to obtain a particulate hydrogel polymer, followed by molding is known. However, since a diameter of the hydrogel polymer particles is about 0.2 to 2.0 mm, the above method had a limitation in providing an ultra-thin sheet having a thickness of 0.5 mm or less, and there was a problem in that an auxiliary substance such as fluff pulp is still required to secure shape retention and absorbency.

Accordingly, there is a need for research on a new type of super absorbent polymer, which does not require an auxiliary substance such as fluff pulp, can be reduced in thickness, and exhibits excellent absorption properties, and a preparation method of the same.

PRIOR ART DOCUMENTS

Patent Document 1: Japanese Patent Application Laid-Open No. Hei 08-73507

Patent Document 2: Japanese Patent Application Laid-Open No. Hei 09-183856

DETAILED DESCRIPTION OF THE INVENTION

Technical Problem

In order to solve the above problems, there are provided a film-type super absorbent polymer capable of replacing the existing powder-type super absorbent polymer, and a preparation method of the same.

Technical Solution

According to an embodiment of the present disclosure, there is provided a super absorbent polymer film including a polymer in which an acrylic acid-based monomer having at least partially neutralized acidic groups is polymerized,
wherein a thickness is 0.001 to 0.5 mm,
a centrifugal retention capacity (CRC) is 23 g/g or more when measured in accordance with EDANA WSP 241.2, and
an elongation calculated by the following Equation 1 is 100% or more:

$$\text{Elongation } (\%) = (L_1 - L_0)/L_0 * 100 \qquad \text{[Equation 1]}$$

in Equation 1,
$L_0$ is an initial gage length, and
$L_1$ is a gage length at fracture when a specimen is pulled at a rate of 0.5 mm per minute.

Preferably, the centrifugal retention capacity (CRC) is 23 g/g to 50 g/g, and the elongation is 100% to 550%.

Preferably, an expansion anisotropy represented by the following Equation 2 is 1.5 or more, or 1.5 to 5, when the super absorbent polymer film cut into a circular shape is immersed in 0.9 wt % sodium chloride aqueous solution and swollen for 60 minutes, followed by measuring thicknesses and diameters, $$\text{Expansion anisotropy} = \frac{(h'/h)}{(d'/d)} \qquad \text{[Equation 2]}$$

in Equation 2,
h is an initial thickness of the super absorbent polymer film, and h' is a thickness after swelling, and
d is an initial diameter of the super absorbent polymer film, and d' is a diameter after swelling.

Preferably, a total light transmittance is 89.5% or more.

According to another embodiment of the present disclosure, there is provided a preparation method of the super absorbent polymer film of Claim 1, including the steps of:

preparing a monomer composition by mixing an acrylic acid-based monomer having at least partially neutralized acidic groups, a cellulose-based thickener, a moisturizing agent, a polymerization initiator, and a solvent;

casting the monomer composition on a substrate to form a monomer composition film;

forming a hydrogel polymer film by irradiating heat and/or light while drawing the monomer composition film; and drying the hydrogel polymer film.

The cellulose-based thickener may be at least one selected from the group consisting of nanocellulose, hydroxyethylcellulose, hydroxypropylcellulose, hydroxyethylmethylcellulose, hydroxypropylmethylcellulose, and sodium carboxymethylcellulose.

The moisturizing agent may be at least one selected from the group consisting of glycerin; diglycerin; ethylene glycol; propylene glycol; butylene glycol; sorbitol; polyethylene glycol; polyglycerin-3; polyglycerin-6; polyglycerin-10; an ester compound of polyglycerin-10 and a C3 to C18 saturated fatty acid; citric acid; triethyl citrate; methyl citrate; sodium citrate; and trisodium 2-methylcitrate.

The cellulose-based thickener may be contained in an amount of 0.01 to 5 parts by weight based on 100 parts by weight of the solid content in the monomer composition.

The moisturizing agent may be contained in an amount of 5 to 70 parts by weight based on 100 parts by weight of the acrylic acid-based monomer.

The monomer composition may have a viscosity at 25° C. of 100 mPa·s or more.

The tension applied to the monomer composition film in the step of forming the hydrogel polymer film may be 40 to 100 N/m.

Advantageous Effects

The super absorbent polymer film of the present disclosure is thin and exhibits excellent absorption performance with excellent flexibility and elasticity, and has little change in the shape of products.

In addition, the super absorbent polymer film of the present disclosure can be manufactured into a product without scattering or leaking, and an auxiliary substance such as fluff pulp is unnecessary, so that it is possible to make products thinner and to reduce the manufacturing process and costs.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

According to an embodiment of the present disclosure, there is provided a super absorbent polymer film including a polymer in which an acrylic acid-based monomer having at least partially neutralized acidic groups is polymerized having a thickness of 0.001 to 0.5 mm, wherein a centrifugal retention capacity (CRC) is 23 g/g or more when measured in accordance with EDANA WSP 241.2, and an elongation calculated by the following Equation 1 is 100% or more:

$$\text{Elongation } (\%) = (L_1 - L_0)/L_0 * 100 \qquad \text{[Equation 1]}$$

in Equation 1, $L_0$ is an initial gage length, and $L_1$ is a gage length at fracture when a specimen is pulled at a rate of 0.5 mm per minute.

In general, the super absorbent polymer is obtained by polymerizing an acrylic acid-based monomer in the presence of an internal cross-linking agent to obtain a hydrogel polymer, and then drying, pulverizing and classifying the hydrogel polymer to prepare a base resin, followed by performing surface modification. The super absorbent polymer prepared in this way is in the form of a powder having a particle size of about 200 to 600 μm, and is mixed and compounded with an auxiliary substance such as fluff pulp to be applied to the product.

However, the powder-type super absorbent polymer may scatter or leak from the product during the manufacturing process of an absorbent core, and it is difficult to uniformly disperse the polymer in the product, making it difficult to uniformly control absorption performance. In addition, it requires an auxiliary substance, so that there is a limitation in thinning the product.

In addition, it is known that the existing sheet-type super absorbent polymer is manufactured by rolling a powder- or particulate-type super absorbent polymer or fixing the super absorbent polymer to a support such as a non-woven fabric for shape retention. However, the sheet-type super absorbent polymer prepared in this method has low process efficiency due to a complicated manufacturing method, and requires a lot of components other than the super absorbent polymer to be fixed to the support. Therefore, there is a limitation in increasing the content of the super absorbent polymer present in the final product, and absorption property is not good. In addition, even when a powder- or particulate-type super absorbent polymer or a particulate-type hydrogel polymer is rolled to form a sheet, it is necessary to undergo a mixing process with a molding agent and a molding process after polymerization of the monomer. Thus, the manufacturing method is complicated and there is a limitation in thinning the product. Further, in order to bind the super absorbent polymer and form a sheet, it is necessary to include a molding auxiliary substance such as fiber or pulp, so that the absorption property is also poor.

Accordingly, the present inventors have conducted a research on a new type of super absorbent polymer that does not require an auxiliary substance such as pulp, can be thinned, does not scatter, and can be used as an absorber by itself, resulting in the present invention.

The super absorbent polymer film of the present disclosure is in the form of a thin film rather than a powder, so there is no risk of scattering or leaking from the product during handling, and can be used without a separate auxiliary substance such as fluff pulp, and exhibits excellent absorption properties by itself.

In the present disclosure, the super absorbent polymer film refers to a super absorbent polymer in the form of a flexible and thin layer or film having a moisture content of 15% or less, or 12% or less, preferably 11% or less. Preferably, the moisture content of the super absorbent polymer film is 15 wt % or less, 12 wt % or less, 11 wt % or less, or 10 wt % or less, and 1 wt % or more, 2 wt % or more, 4 wt % % or more, or 6 wt % or more.

Meanwhile, the "moisture content" in the present disclosure indicates the amount of moisture contained in the sample as a percentage with respect to the weight of the sample before drying. That is, the moisture content can be calculated by dividing a value obtained by subtracting the weight after drying of the sample from the weight before drying of the sample by the weight before drying of the sample, and then multiplying by 100. At this time, the drying condition for measuring the moisture content is that the temperature is increased to about 150° C. and maintained at 150° C., and the total drying time is 20 min including 5 min of a heating step.

In one embodiment, the super absorbent polymer film may have a moisture content of 15% or less, and may be in the form of a transparent, elastic, and flexible film.

The transparent super absorbent polymer film means that a total light transmittance with respect to visible light is 89.5% or more when the thickness is in the range of 0.001 to 0.5 mm. The total light transmittance of the super absorbent polymer film according to the embodiment of the present disclosure may be 90% or more, 90.4% or more, 91% or more, 91.5% or more, or 92% or more. The total light transmittance may be theoretically 100%, for example, it may be 99% or less.

In addition, the super absorbent polymer film of the present disclosure may have a yellow index of 2.6 or less, 2.5 or less, 2.4 or less, 2.3 or less, 1.9 or less, 1.5 or less, or 1.3 or less, when measured in accordance with ASTM D1925 with a thickness of 0.001 to 0.5 mm.

The super absorbent polymer film of the present disclosure has a thickness of 0.5 mm or less, preferably 0.4 mm or less, 0.3 mm or less, 0.2 mm or less, or 0.1 mm or less and 0.001 mm or more, 0.005 mm or more, 0.01 mm or more, or 0.05 mm or more, which can implement a thinner absorbent than existing powder-type super absorbent polymers.

The super absorbent polymer film of the present disclosure has a centrifugal retention capacity (CRC) of 23 g/g or more, 25 g/g or more, 28 g/g or more, 30 g/g or more, or 33 g/g or more, when measured in accordance with EDANA WSP 241.2, indicating excellent absorption properties. A method for measuring the centrifugal retention capacity of the super absorbent polymer film may be specified in Examples to be described later.

The higher centrifugal retention capacity can be evaluated as the better, and there is no theoretical upper limit, but may be, for example, 50 g/g or less, or 48 g/g or less.

In addition, the super absorbent polymer film of the present disclosure exhibits excellent water retention capacity as described above and high elongation.

Specifically, the super absorbent polymer film of the present disclosure has a thickness of 0.001 to 0.5 mm, and an elongation of 100% or more, 120% or more, 150% or more, 180% or more, or 200% or more, and 550% or less, 530% or less, or 510% or less. In this case, the elongation may be calculated according to Equation 1 above, and a measurement method may be specified in Examples to be described later.

Preferably, the super absorbent polymer film may have a centrifugal retention capacity of 23 g/g to 50 g/g, and an elongation of 100% to 550%.

Preferably, the super absorbent polymer film may have a thickness of 0.05 to 0.5 mm, a centrifugal retention capacity of 24 g/g to 48 g/g, and an elongation of 180% to 510%.

The super absorbent polymer film may include a polymer in which an acrylic acid-based monomer having at least partially neutralized acidic groups is polymerized in the presence of a cellulose-based thickener and a moisturizing agent.

As such, the super absorbent polymer film of the present disclosure has excellent absorbency as well as flexibility and elasticity, and thus can be used for various purposes such as waterproofing and reinforcing materials for diapers, wires and cables, electrolyte absorbers, flame retardants, wound protection agents, fresh-keeping agents for food, water retaining soil products, etc.

At the same time, the super absorbent polymer film of the present disclosure has high expansion anisotropy. That is, when the super absorbent polymer film is immersed in saline and swelled, an expansion ratio in the thickness direction perpendicular to the plane is higher than an expansion ratio in the plane direction.

Specifically, the expansion anisotropy can be measured by the following method. A super absorbent polymer film having an initial thickness of h is cut into a circular shape having a diameter d, and immersed in 0.9 wt % sodium chloride aqueous solution at 25° C. for 60 minutes to free-swell. Thereafter, the swollen super absorbent polymer film is removed from the sodium chloride aqueous solution, and the moisture not absorbed in the super absorbent polymer film is removed using a sieve. After measuring the diameter d' and thickness h' of the swollen super absorbent polymer film, the expansion anisotropy is calculated by dividing the expansion ratio in the thickness direction (h'/h) by the expansion ratio in the plane direction (d'/d).

$$\text{Expansion anisotropy} = \frac{(h'/h)}{(d'/d)} \qquad \text{[Equation 2]}$$

The thicknesses (h, h') and diameters (d, d') are average values derived from measurements at three or more different positions in the same super absorbent polymer film using a microscope and a precision ruler.

Unlike existing super absorbent polymers, the super absorbent polymer film of the present disclosure is manufactured in the form of a thin film, and can be applied to an absorbent layer of a product as it is without additional processing or compounding with an auxiliary substance. Therefore, if the area of the super absorbent polymer film expands excessively compared to the thickness when absorbing liquid, there is a risk of deformation of the product, which is not preferable.

However, since the super absorbent polymer film of the present disclosure has high expansion anisotropy of 1.5 or more, it can exhibit excellent absorption performance while maintaining the shape of the product. Preferably, the expansion anisotropy of the super absorbent polymer film may be 1.6 or more, 1.8 or more, 1.9 or more, 2.0 or more, or 2.3 or more, and 5 or less, 4.5 or less, 4 or less, or 3.5 or less.

The shape of the super absorbent polymer film is not particularly limited as long as the thickness thereof satisfies the above-mentioned range. That is, the super absorbent polymer film may be in the form of a flat film having a constant thickness without irregularities on the surface, or may have a pattern formed on the surface to improve flowability of the liquid. In this case, the shape of the pattern is not particularly limited, and the pattern may be formed by variously adjusting the length, width, depth, etc. of the recess and convex portions, if necessary.

Meanwhile, according to another embodiment of the present disclosure, there is provided a preparation method of the super absorbent polymer film.

Specifically, the super absorbent polymer film may be prepared by a preparation method including the steps of: preparing a monomer composition by mixing an acrylic acid-based monomer having at least partially neutralized acidic groups, a cellulose-based thickener, a moisturizing agent, a polymerization initiator, and a solvent;

casting the monomer composition on a substrate to form a monomer composition film;

forming a hydrogel polymer film by irradiating heat and/or light while drawing the monomer composition film; and drying the hydrogel polymer film.

In the present disclosure, a monomer composition film is prepared from a monomer composition solution having a controlled viscosity by a solution casting method, and the film is polymerized and dried to prepare a super absorbent polymer in the form of a film.

In particular, in the present disclosure, physical properties of the super absorbent polymer film can be adjusted by applying tension to the monomer composition film in the polymerization step, followed by drawing.

In the preparation method of the present disclosure, the monomer composition, which is a raw material of the super absorbent polymer, contains an acrylic acid-based monomer having at least partially neutralized acidic groups, a cellulose-based thickener, a moisturizing agent, a polymerization initiator, and a solvent.

First, the acrylic acid-based monomer is a compound represented by the following Chemical Formula 1:

$$R^1-COOM^1 \qquad \text{[Chemical Formula 1]}$$

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer includes at least one selected from the group consisting of acrylic acid, methacrylic acid, and a monovalent metal salt, a divalent metal salt, an ammonium salt, and an organic amine salt thereof.

Herein, the acrylic acid-based monomers may be those having acidic groups which are at least partially neutralized. Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 wt %, or 45 to 75 mol %. The range of the degree of neutralization can be adjusted according to final properties. An excessively high degree of neutralization causes the neutralized monomers to be precipitated, and thus polymerization may not readily occur, whereas an excessively low degree of neutralization may deteriorate the absorbency of the polymer.

In a preferred embodiment, sodium hydroxide (NaOH), potassium hydroxide (KOH), or a combination thereof may be used as the alkali substance. In particular, potassium hydroxide is preferable to prepare a super absorbent polymer film having better flexibility and dimensional stability.

The concentration of the acrylic acid-based monomer may be about 20 to about 60 wt %, preferably about 40 to about 50 wt %, based on the monomer composition including the raw materials of the super absorbent polymer and the solvent, and it may be appropriately selected in consideration of the reaction time and the reaction conditions. However, when the concentration of the monomer is excessively low, the yield of the super absorbent polymer is low and there may be a problem in economic efficiency. In contrast, when the concentration is excessively high, a problem may occur in the process such as some of the monomer is precipitated, and thus physical properties of the super absorbent polymer may be deteriorated.

Meanwhile, in the present disclosure, a thickener and a moisturizing agent are contained in the monomer composition so that the monomer composition can be applied in the form of a film by a solution casting method.

As the thickener and the moisturizing agent are contained at the same time, the monomer composition of the present disclosure may exhibit a viscosity suitable for casting in the form of a film, can maintain an appropriate moisture content in the polymerization process after film casting, and the super absorbent polymer film to be prepared may have high flexibility.

In the present disclosure, a cellulose-based thickener is used as the thickener, and specifically, at least one selected from the group consisting of nanocellulose, hydroxyethylcellulose, hydroxypropylcellulose, hydroxyethylmethylcellulose, hydroxypropylmethylcellulose, and sodium carboxymethylcellulose may be used. Preferably, nanocellulose, hydroxyethylcellulose, sodium carboxymethylcellulose, or a combination thereof may be used.

The cellulose-based thickener may be contained in an amount of 0.01 parts by weight or more, 0.1 parts by weight or more, 0.2 parts by weight or more, or 0.4 parts by weight or more, and 5 parts by weight or less, 3 parts by weight or less, 1 parts by weight or less, or 0.9 parts by weight or less based on 100 parts by weight of the solid content in the monomer composition.

Herein, the solid content in the monomer composition means all components of the composition excluding the solvent. That is, the solid content means the total content of an acrylic acid-based monomer, an alkali substance for neutralizing the acrylic monomer, a cellulose-based thickener, a moisturizing agent, a cross-linking agent, a thermal initiator, a photoinitiator, and an internal cross-linking agent.

If the content of the cellulose-based thickener is less than 0.01 parts by weight based on 100 parts by weight of the solid content in the monomer composition, sufficient thickening effect cannot be ensured, so it may be difficult to prepare a monomer composition film. Conversely, if it exceeds 5 parts by weight, the viscosity of the monomer composition becomes excessively high, so that the thickness of the film becomes thick, and it may be difficult to uniformly control the thickness of the film.

As the moisturizing agent, a substance normally used as a moisturizing component in pharmaceuticals, cosmetics, chemical products, and the like may be used without limitation. Examples of the moisturizing agent include at least one selected from the group consisting of polyhydric alcohols having two or more hydroxyl groups in a molecule, citric acid, and citrate.

Specifically, as the polyhydric alcohol, a C3 to C30 polyhydric alcohol having 3 to 12 hydroxyl groups in a molecule may be used. For example, the polyhydric alcohol may be at least one selected from the group consisting of glycerin; diglycerin; ethylene glycol; propylene glycol; butylene glycol; sorbitol; polyethylene glycol; polyglycerin-3; polyglycerin-6; polyglycerin-10; and an ester compound of polyglycerin-10 and a C3 to C18 saturated fatty acid (e.g., polyglyceryl-10 distearate, polyglyceryl-10 oleate, polyglyceryl-10 laurate, etc.). Among them, at least one selected from the group consisting of glycerin, diglycerin, propylene glycol, and sorbitol may be preferably used.

In addition, citric acid and/or citrate may also be used as the moisturizing agent. Examples of the citrate include triethylcitrate, methylcitrate, sodium citrate, trisodium 2-methylcitrate, and the like.

The moisturizing agent may be used in an amount of 5 parts by weight or more, parts by weight or more, 20 parts by weight or more, or 30 parts by weight or more, and 70 parts by weight or less, 60 parts by weight or less, or 50 parts by weight or less based on 100 parts by weight of the acrylic acid-based monomer.

If the content of the moisturizing agent is less than 5 parts by weight based on 100 parts by weight of the acrylic acid-based monomer, the moisture content of the monomer composition film is not sufficient, so that the film may dry out or crumble in the subsequent polymerization and drying process and flexibility of the super absorbent polymer film to be prepared cannot be achieved. Conversely, if the content of the moisturizing agent exceeds 70 parts by weight based on 100 parts by weight of the acrylic acid-based monomer, there may be a problem in that absorbency of the super absorbent polymer film is reduced. Therefore, the content of the moisturizing agent preferably satisfies the above range.

The monomer composition may optionally contain an internal cross-linking agent for cross-linking the polymer. As the internal cross-linking agent, those used in the manufacture of existing super absorbent polymers may be used. The internal cross-linking agent may be a cross-linking agent having one or more ethylene-based unsaturated groups in addition to one or more functional groups which may react with a water-soluble substituent of the acrylic acid-based monomer; or a cross-linking agent having two or more functional groups which may react with a water-soluble substituent of the monomer and/or a water-soluble substituent formed by hydrolysis of the monomer.

As the specific example of the internal cross-linking agent, a C8-C12 bisacrylamide, bismethacrylamide, a poly(meth)acrylate of C2-C10 polyol, a poly(meth)allylether of C2-C10 polyol, or the like may be used. More specifically, at least one selected from the group consisting of N,N'-methylenebis(meth)acrylate, ethyleneoxy(meth)acrylate, polyethyleneoxy(meth)acrylate, propyleneoxy(meth)acrylate, glycerin diaciylate, glycerin triacrylate, trimethylol triacrylate, polyethylene glycol diacrylate, triallylamine, triaryl cyanurate, triallyl isocyanate, polyethylene glycol, diethylene glycol and propylene glycol may be used. In one embodiment, polyethylene glycol diacrylate may be used as the internal cross-linking agent.

This internal cross-linking agent may be contained in a concentration of 3000 ppm or less with respect to the monomer composition, so that the polymerized polymer can be cross-linked. In one embodiment, the internal cross-linking agent may be contained in ppm or more, 50 ppm or more, 100 ppm or more, or 500 ppm or more, and 3000 ppm or less, 2500 ppm or less, 2000 ppm or less, 1500 ppm or less, or 1000 ppm or less.

The polymerization initiator used in the preparation method of the super absorbent polymer film is not particularly limited as long as it is generally used for the preparation of a super absorbent polymer.

Specifically, the polymerization initiator may be an initiator for thermal polymerization or an initiator for photopolymerization by UV radiation according to the polymerization method. However, even when the photopolymerization method is applied thereto, a certain amount of heat is generated by UV radiation and the like, and some heat occurs as the polymerization reaction, an exothermal reaction, progresses. Therefore, the composition may additionally include the thermal polymerization initiator. In a preferred embodiment, a photopolymerization initiator and a thermal polymerization initiator may be used simultaneously as the polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO(2,4,6-Trimethylbenzoyldiphenylphosphine oxide), Irgacure 819(Phenylbis(2,4,6-trimethylbenzoyl)phosphine oxide), and the like may be used. More various photopolymerization initiators are well disclosed in "UV Coatings: Basics, Recent Developments and New Application (Elsevier, 2007)" written by Reinhold Schwalm, p 115, and the present disclosure is not limited thereto.

A concentration of the photopolymerization initiator in the monomer composition may be 10 ppm or more, 20 ppm or more, or 40 ppm or more, and 2000 ppm or less, 1000 ppm or less, 500 ppm or less, or 100 ppm or less. If the concentration of the photopolymerization initiator is excessively low, the polymerization rate may become slow, and if the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate $(Na_2S_2O_8)$, potassium persulfate $(K_2S_2O_8)$, ammonium persulfate $((NH_4)_2S_2O_8)$, and the like may be used as examples of the persulfate-based initiators; and 2,2-azobis(2-amidinopropane) dihydrochloride, 2,2-azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

A concentration of the thermal polymerization initiator in the monomer composition may be 10 ppm or more, 100 ppm or more, or 500 ppm or more, and 2000 ppm or less, 1500 ppm or less, or 1000 ppm or less. If the concentration of the thermal polymerization initiator is excessively low, additional thermal polymerization hardly occurs and the effect of adding the thermal polymerization initiator may be insufficient. If the concentration of the thermal polymerization initiator is excessively high, the molecular weight of the super absorbent polymer may become low and the properties may be uneven.

In the preparation method of the present disclosure, the monomer composition may further contain a plasticizer, a preservation stabilizer, an antioxidant, or the like, if necessary.

The raw materials such as the acrylic acid-based unsaturated monomer, the internal cross-linking agent, the polymerization initiator, and the additive may be prepared in the form of a monomer composition solution dissolved in a solvent.

Any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used alone or in combination. For example, water may be used as the solvent.

In the present disclosure, the monomer composition exhibits a viscosity suitable for a solution casting method by containing a cellulose-based thickener and a moisturizing agent. Specifically, the viscosity at 25° C. of the monomer composition may be 100 mPa·s or more, 150 mPa·s or more, 200 mPa·s or more, or 240 mPa·s or more, and 5000 mPa·s or less, 2300 mPa·s or less, 2000 mPa·s or less, or 1600 mPa·s or less. The viscosity of the monomer composition may be measured with a viscometer (e.g., TV-22 manufactured by TOKI) under the conditions of spindle #1 and a rotational speed of 1 rpm.

If the viscosity of the monomer composition is less than 100 mPa·s, it may be difficult to cast the monomer composition to a uniform thickness, and polymerize it while drawing it. Conversely, if the viscosity of the monomer composition exceeds 5000 mPa·s, it is difficult to prepare a uniform monomer composition, and flowability of the monomer composition is low, so that processability is deteriorated and defoaming is difficult.

The monomer composition is prepared, and then casted on a substrate to prepare a monomer composition film. Then, it is polymerized while drawing it to form a hydrogel polymer film. Casting and polymerization of the monomer composition may be continuously performed through a roll-to-roll process.

First, a monomer composition film is prepared by applying a monomer composition on a substrate.

The material of the substrate is not particularly limited, but it is preferable to use a material in which the monomer composition is easily applied and the hydrogel polymer film is easily separated after polymerization.

Specifically, a polyethylene terephthalate (PET) film in which at least one surface is hydrophobically treated with silicone or fluorine, which is usually used as a release film, may be used as the substrate. For example, the substrate may be a PET film surface-treated with a siloxane-based polymer or polytetrafluoroethylene (Teflon®). However, the material of the substrate is not limited thereto, and a suitable substrate may be selected depending on the composition and properties of the monomer composition.

Unlike the general polymer solution casting method in which the solvent is removed after casting the polymer solution, the present disclosure immediately performs the drawing and polymerization process after the monomer composition is applied on the substrate so as not to decrease the moisture content.

If the moisture content of the monomer composition film is too low, components constituting the monomer composition may be precipitated before polymerization, and there may be a problem in that the film is broken after polymerization. Accordingly, the moisture content of the monomer composition film preferably satisfies the range of 30 wt % to 60 wt %, 30 wt % to 50 wt %, or 30 wt % to 45 wt %.

The thickness of the monomer composition film may be appropriately adjusted depending on the thickness of the desired super absorbent polymer film. Although the thickness of the monomer composition film hardly changes during the polymerization step, the thickness may decrease by about 10 to 40% or 15 to 35% while the moisture content decreases during the drying process of the hydrogel polymer film after polymerization. In consideration of this, a monomer composition film may be prepared with an appropriate thickness.

For an example, the thickness of the monomer composition film may be 0.8 mm or less, 0.6 mm or less, or 0.5 mm or less, and 0.001 mm or more, or 0.01 mm or more, but is not limited thereto. It can be appropriately adjusted depending on the composition of the monomer composition, specific conditions in the polymerization and drying steps, and the thickness of the desired super absorbent polymer film.

Subsequently, a polymerization reaction is performed by irradiating heat and/or light while drawing the monomer composition film in the longitudinal direction (MD direction) to form a hydrogel polymer film. Drawing the film during polymerization as described above can control physical properties such as elongation and expansion anisotropy.

At this time, the tension applied to the monomer composition film may be 40 N/m or more, 45 N/m or more, 50 N/m or more, or 60 N/m or more, and 100 N/m or less, 90 N/m or less, or 80 N/m or less. If the film is drawn by applying an excessively large tension, the monomer composition film may be broken or the thickness may be excessively thin, and if the tension is too small, the expansion anisotropy and elongation of the film may not be properly controlled.

The polymerization temperature may be appropriately adjusted depending on the composition of the monomer composition, but is preferably 40° C. or more, or 50° C. or more for the smooth reaction. In addition, if the temperature is too high, the solvent evaporates and components constituting the monomer composition may be precipitated. Therefore, the polymerization temperature is preferably 90° C. or less or 80° C. or less.

The moisture content of the hydrogel polymer film prepared through the polymerization step may be about 20 wt % or more, preferably 25 wt % or more, and 40 wt % or less, or 35 wt % or less. Accordingly, the hydrogel polymer film is dried such that the moisture content is 15 wt % or less to prepare a final super absorbent polymer film.

The temperature of the drying step may be preferably 80 to 150° C., or 90 to 100° C. Drying for about 5 to 30 minutes within the above temperature range may provide a super absorbent polymer film having the moisture content of 15 wt % or less, 12 wt % or less, 10 wt % or less, or 9 wt % or less, and 1 wt % or more, 2 wt % or more, 4 wt % or more, or 6 wt % or more.

As described above, the super absorbent polymer film prepared according to the preparation method satisfies a thickness of 0.5 mm or less and an expansion anisotropy of 1.5 or more, and exhibits excellent absorbency and mechanical properties. Since the super absorbent polymer film of the present disclosure can be used as an absorbent by itself without compounding with an auxiliary substance such as pulp, it can be suitably used for slim and thin-film products, and can exhibit excellent absorption performance without deformation of the product.

Hereinafter, the present invention will be described in more detail with the following preferred examples, but these examples are provided for illustrative purposes only. It is apparent to those skilled in the art that various changes and modifications can be made within the scope and spirit of the present invention. Therefore, it is obvious that the changes and modifications are within the scope of the present invention.

EXAMPLES

Example 1

A neutralized solution in which 70 mol % of acrylic acid was neutralized was prepared by mixing 55 g of acrylic acid, 66.6 g of a 45 wt % potassium hydroxide (KOH) solution, and 55 g of water.

Hydroxyethyl cellulose (HEC, Natrosol 250HR manufactured by Ashland) as a thickener, glycerin as a moisturizing agent, sodium persulfate as a thermal polymerization initiator, and Irgacure 819 as a photopolymerization initiator were added to the neutralized solution to prepare a monomer composition having a solid content of 54 wt %.

At this time, HEC was added in an amount of 0.45 parts by weight based on 100 parts by weight of the solid content in the monomer composition, glycerin was added in an amount of 40 parts by weight based on 100 parts by weight of acrylic acid, and the thermal polymerization initiator and the photopolymerization initiator were added in an amount of 1000 ppm and 80 ppm based on the total weight of the monomer composition, respectively.

A viscosity of the prepared monomer composition at 25° C. was measured using TV-22 manufactured by TOKI under the conditions of 1 rpm and Rotor #1. As a result, the viscosity of the monomer composition was confirmed to be 247 mPa·s.

Subsequently, the monomer composition was coated on one surface of a polyethylene terephthalate (PET) release film (Mitsubishi MRL film) whose surface was hydrophobically treated with a siloxane-based polymer to form a 0.1 mm thick monomer composition film (moisture content of 30%). A comma coater (Gap 365 μm) was used for coating, and an applicator roll moved at 0.5 m/min.

Then, polymerization was performed by irradiating UV light of 370 mJ/cm$^2$ to the monomer composition film to form a hydrogel polymer film. Herein, a polymerization reaction was performed while drawing the monomer composition film with tension of 60 N/m in the MD direction. The thickness of the prepared hydrogel polymer film was 0.1 mm, and it was confirmed that there was no significant change compared to the monomer composition and the moisture content was 30 wt %.

Subsequently, the prepared hydrogel polymer film was dried at a temperature of 90° C. for 10 minutes to prepare a super absorbent polymer film (SAP film) having a moisture content of 9.84 wt % and a thickness of 0.083 mm.

Examples 2 to 4

Super absorbent polymer films of Examples 2 to 4 were prepared in the same manner as in Example 1, except that the monomer composition further contains polyethylene glycol diacrylate (PEGDA, MW=400, manufacturer: Aldrich) as an internal cross-linking agent, and the composition of the monomer composition and the thickness of the monomer composition film were changed as shown in Table 1 below.

Example 5

A monomer composition was prepared in the same manner as in Example 1, except that sodium carboxymethyl cellulose (CMC, average weight average molecular weight: 250,000, degree of substitution: 0.7) was used in an amount of 0.68 parts by weight based on 100 parts by weight of the solid content in the monomer composition instead of HEC as a thickener, and 2000 ppm (based on the total weight of the monomer composition) of PEGDA was further contained as an internal cross-linking agent.

The monomer composition was coated on one surface of a polyethylene terephthalate (PET) release film whose surface was hydrophobically treated with a siloxane-based polymer to a thickness of 0.2 mm to form a monomer composition film. Then, the monomer composition film was polymerized by irradiating UV light of 370 mJ/cm$^2$ to form a hydrogel polymer film. Herein, a polymerization reaction was performed while drawing the monomer composition film with tension of 60 N/m in the MD direction.

Subsequently, the prepared hydrogel polymer film was dried at a temperature of 110° C. for 15 minutes to prepare a super absorbent polymer film.

Example 6

A monomer composition was prepared in the same manner as in Example 1, except that propylene glycol was used instead of glycerin as a moisturizing agent, and 2000 ppm of PEGDA (based on the total weight of the monomer composition) was further contained as an internal cross-linking agent.

The monomer composition was coated on one surface of a polyethylene terephthalate (PET) release film whose surface was hydrophobically treated with a siloxane-based polymer to a thickness of 0.2 mm to form a monomer composition film. Then, the monomer composition film was polymerized by irradiating UV light of 370 mJ/cm$^2$ to form a hydrogel polymer film. Herein, a polymerization reaction was performed while drawing the monomer composition film with tension of 60 N/m in the MD direction.

Subsequently, the prepared hydrogel polymer film was dried at a temperature of 110° C. for 15 minutes to prepare a super absorbent polymer film.

Example 7

A super absorbent polymer film was prepared in the same manner as in Example 3, except that the drawing tension applied to the monomer composition film during polymerization was 80 N/m.

Comparative Example 1

Referring to Example 1 of Japanese Patent Application No. 1995-154195 (Japanese Patent Application Laid-Open No. Hei 08-73507), a sheet-type super absorbent polymer was prepared by the following method.

A monomer composition containing 36 g of acrylic acid, 37.3 g of triethanolamine, 0.08 g of trimethylolpropane triacrylate, 18.3 g of deionized water, 0.1 g of potassium persulfate, 0.0025 g of L-ascorbic acid (oxidation/reduction initiator), and 0.92 g of hydroxyethyl cellulose (acrylic acid triethanolamine salt and acrylic acid account for about 75 wt % and 25 wt % of all monomers, respectively, and a monomer concentration of the monomer composition is about 80 wt %) was prepared. This monomer composition was sandwiched between two Teflon sheets and subjected to thermal polymerization in a hot air dryer at 80° C. with a clearance of 0.5 mm to obtain a sheet-type super absorbent polymer having a thickness of 0.434 mm. The moisture content of the prepared super absorbent polymer was found to be 6.62 wt %, and a separate drying process was not performed after the polymerization.

Comparative Example 2

Referring to Example 3 of Japanese Patent Application No. 1995-154195 (Japanese Patent Application Laid-Open No. Hei 08-73507), a sheet-type super absorbent polymer was prepared by the following method.

A monomer composition containing 36 g of acrylic acid, 14.9 g of triethanolamine, 8.4 g of potassium hydroxide (KOH), 0.05 g of trimethylolpropane triacrylate, 14.8 g of deionized water, 0.1 g of potassium persulfate, 0.0025 g of L-ascorbic acid, and 0.7 g of hydroxyethyl cellulose was prepared. This monomer composition was sandwiched between two Teflon sheets and subjected to thermal polymerization in a hot air dryer at 80° C. under the condition of a clearance of 1 mm to obtain a sheet-type super absorbent polymer having a thickness of 1.063 mm. The moisture content of the prepared super absorbent polymer was found to be 10.4 wt %, and a separate drying process was not performed after the polymerization.

Comparative Example 3

A neutralized solution in which 70 mol % of acrylic acid was neutralized was prepared by mixing 55 g of acrylic acid, 66.6 g of a 45 wt % potassium hydroxide (KOH) solution, and 55 g of water.

Hydroxyethyl cellulose (HEC, 250HR from Ashland Corporation), glycerin, and sodium persulfate as a thermal polymerization initiator were added to the neutralized solution to prepare a monomer composition having a solid content of 54 wt %.

At this time, HEC was added in an amount of 0.45 parts by weight based on 100 parts by weight of the solid content in the monomer composition, glycerin was added in an amount of 40 parts by weight based on 100 parts by weight of acrylic acid, and sodium persulfate was added in an amount of 1000 ppm based on the total weight of the monomer composition as a thermal polymerization initiator.

This monomer composition was sandwiched between two Teflon sheets and subjected to thermal polymerization in a hot air dryer at 80° C. with a clearance of 1 mm to obtain a sheet-type super absorbent polymer having a thickness of 1 mm and a moisture content of 10 wt %.

Subsequently, the prepared hydrogel polymer was dried at 110° C. for 10 minutes to prepare a sheet-type super absorbent polymer having a moisture content of 9.5 wt % and a thickness of 0.976 mm.

Comparative Example 4

A sheet-type super absorbent polymer was prepared in the same manner using the same monomer composition as in Comparative Example 1, except that the clearance was adjusted to prepare a sheet-type super absorbent polymer having a thickness of 0.357 mm and a moisture content of 8.91 wt %.

Comparative Example 5

A sheet-type super absorbent polymer was prepared in the same manner as in Example 2, except that glycerin was not included during the preparation of the monomer composition and the thickness of the monomer composition film was set to 0.1 mm.

Comparative Example 6

A super absorbent polymer film was prepared in the same manner as in Example 3, except that the monomer composition film was not drawn during polymerization.

Comparative Example 7

Referring to Example 14 of Japanese Patent Application Laid-Open No. Hei 09-183856, a sheet-type super absorbent polymer was prepared by the following method.

In a 1 L beaker, 400 ml of cyclohexane and 1.6 g of sucrose fatty acid ester surfactant with an HLB value of 6 were added and stirred to prepare a reaction solvent for reverse-phase suspension polymerization.

In 110.7 g of a monomer aqueous solution having a solid content of 35% of acrylic acid and sodium acrylate (degree of neutralization: 75%) as monomer components, 5.85 mg of N,N-methylenebisacrylamide as an internal cross-linking agent and 193.6 mg of hydroxyethyl cellulose (HEC) as a thickener were dissolved to prepare a monomer aqueous solution. Then, 58.5 mg of potassium persulfate, a polymerization initiator, was added and dissolved while bubbling nitrogen gas in the monomer aqueous solution.

A monomer aqueous solution in which a polymerization initiator was dissolved was added to the prepared reverse-phase suspension polymerization solvent, followed by stirring at 60° C. for 2 hours to proceed with polymerization to obtain a gel polymer.

After drying the obtained polymer at 160° C., 2 g of glycerin was added to 8 g of the dried polymer particles, and water was sprayed such that the moisture content was 20%. The polymer particles to which glycerin and water were added were uniformly spread on a 10 cm*10 cm plate, and left in a constant temperature and humidity room (25° C., RH 90%) for 10 minutes. Subsequently, a sheet-type super absorbent polymer having a thickness of 1.042 mm was prepared by rolling for 5 minutes at a temperature of 150° C. and a pressure of 350 gf/cm².

TABLE 1

| | Thickness of monomer composition film (mm) | Viscosity of monomer composition (mPas)[1] | Degree of neutralization of monomer (%) | Solid content (%) | Thickener (parts by weight) | Internal cross-linking agent (ppm) | Thermal initiator (ppm) | Photo-initiator (ppm) | Oxidation/reduction initiator (ppm) |
|---|---|---|---|---|---|---|---|---|---|
| | | | | | | Content in monomer composition | | | |
| Ex. 1 | 0.1 | 247 | 70 | 54 | 0.45 | 0 | 1000 | 80 | 0 |
| Ex. 2 | 0.15 | 247 | 70 | 54 | 0.45 | 500 | 1000 | 80 | 0 |
| Ex. 3 | 0.1 | 201 | 70 | 54 | 0.45 | 1000 | 1000 | 80 | 0 |
| Ex. 4 | 0.4 | 1383 | 70 | 54 | 0.75 | 500 | 1000 | 80 | 0 |
| Ex. 5 | 0.2 | 332 | 70 | 54 | 0.68 | 2000 | 1000 | 80 | 0 |
| Ex. 6 | 0.2 | 562 | 70 | 54 | 0.45 | 2000 | 1000 | 80 | 0 |
| Ex. 7 | 0.1 | 215 | 70 | 54 | 0.45 | 1000 | 1000 | 80 | 0 |
| Comp. Ex. 1 | — | n/a | 75 | 80.3 | 0.99 | 863 | 1079 | 0 | 27 |
| Comp. Ex. 2 | — | n/a | 68 | 80.3 | 0.93 | 667 | 1334 | 0 | 33 |
| Comp. Ex. 3 | 1 | 1189 | 70 | 54 | 0.75 | 2000 | 1000 | 0 | 0 |
| Comp. Ex. 4 | — | n/a | 75 | 80.3 | 0.99 | 863 | 1079 | 0 | 27 |
| Comp. Ex. 5 | 0.1 | 245 | 70 | 54 | 0.45 | 500 | 1000 | 80 | 0 |
| Comp. Ex. 6 | 0.1 | 215 | 70 | 54 | 0.45 | 1000 | 1000 | 80 | 0 |
| Comp. Ex. 7 | — | n/a | 75 | 40 | 0.17 | 200 | 2000 | 0 | 0 |

In Table 1, the content of each component except for the thickener in the monomer composition was expressed in wt % or ppm based on the total weight of the monomer composition, and the content of the thickener was expressed in parts by weight based on 100 parts by weight of the solid content in the monomer composition.

Since the monomer compositions of Comparative Examples 1, 2, and 4 contained an oxidation/reduction initiator, polymerization initiated during the measurement, which made it impossible to measure a viscosity of the monomer composition. Since Comparative Example 7 used a reversed-phase suspension polymerization method, a viscosity of the monomer composition was not separately measured.

EXPERIMENTAL EXAMPLES

Physical properties of the super absorbent polymer film or sheet of each Example and Comparative Example were evaluated by the following method, and the results are summarized in Tables 2 and 3 below.

(1) Moisture Content

The moisture content was calculated with the weight before drying (a) and the weight after drying (b) of the super absorbent polymer film (or sheet) specimen. At this time, the specimen was dried in such a way that the temperature was increased from room temperature (25° C.) to 150° C. over 5 minutes, and then maintained at 150° C. for 15 minutes.

Moisture content (%)=(a−b)/a*100

(2) Thickness of Super Absorbent Polymer Film (or Sheet)

The thickness was measured at three different arbitrary positions in the super absorbent polymer film (or sheet) using a film thickness meter from Mitutoyo, and the average value thereof was calculated.

(3) Centrifugal Retention Capacity (CRC, g/g)

The centrifugal retention capacity (CRC) was measured in accordance with EDANA WSP 241.2. The moisture content of the super absorbent polymer of each Example and Comparative Example to be measured is as shown in Table 2 below, and the centrifugal retention capacity was measured without adjusting the moisture content.

Specifically, the super absorbent polymer film or sheet was cut to have a weight (W0) of 0.08 to 0.12 g, put in a non-woven envelope, and sealed. Then, it was immersed in 0.9 wt % sodium chloride aqueous solution (physiological saline) at room temperature. After 30 minutes, the envelope was centrifuged at 250G for 3 minutes to drain, and the weight W2 (g) of the envelope was measured. Further, after carrying out the same operation without using the polymer, the weight W1 (g) of the envelope was measured. Then, CRC (g/g) was calculated by using the obtained weight values according to the following equation.

CRC(g/g)={[W2(g)−W1(g)]/W0(g)}−1

(4) Elongation (%)

A specimen was prepared by cutting the super absorbent polymer film or sheet in a rectangular shape of 20 mm×60 mm such that cut surface is smooth. Then, an initial gage length of a tensile strength measuring device (TAXTplus, manufactured by Stable Micro Systems) was set to 20 mm, and the specimen was mounted. The specimen was pulled at a rate of 0.5 mm per minute to measure a gage length at fracture, and the elongation was obtained by dividing the value by the initial gage length.

Elongation (%)=(L_1−L_0)/L_0*100     [Equation 1]

in Equation 1, $L_0$ is an initial gage length, and $L_1$ is a gage length at fracture.

(5) Expansion Anisotropy

A super absorbent polymer film (or sheet, hereinafter the same) having an initial thickness of h was cut into a circular shape having a diameter d, and immersed in 0.9 wt % sodium chloride aqueous solution at 25° C. for 60 minutes to free-swell. Thereafter, the swollen super absorbent polymer film was removed from the sodium chloride aqueous solution, and the moisture not absorbed in the super absorbent polymer film was removed using a sieve. After measuring the diameter d' and thickness h' of the swollen super absorbent polymer film, the expansion anisotropy was calculated by dividing the expansion ratio in the thickness direction (h'/h) by the expansion ratio in the plane direction (d'/d).

$$\text{Expansion anisotropy} = \frac{(h'/h)}{(d'/d)} \qquad \text{[Equation 2]}$$

The thicknesses (h, h') and diameters (d, d') are average values derived from measurements at three or more different positions in the same super absorbent polymer film using a microscope and a precision ruler.

In this experimental example, the initial diameter (d) of the super absorbent polymer film specimen was 15 mm, and h, h', and d' values of each specimen are shown in Table 2 below.

(6) Total Light Transmittance (%) and Yellow Index

The total light transmittance with respect to visible light and the yellow index according to ASTM D1925 were measured using COH-400 (manufactured by NIPPON DEN-SHOCU).

(7) Bending Test (Flexibility)

The flexibility of each super absorbent polymer film or sheet was confirmed according to ASTM D522 using a cylindrical mandrel bend tester (KP M5500). In the test, a mandrel having a diameter of 4 mm (4R) was used. When it was broken or cracked, it was evaluated as X, and when its shape was maintained, it was evaluated as O.

TABLE 2

| | Moisture content (%) | CRC(g/g) | Elongation (%) | Total light transmittance (%) | Yellow Index | Flexibility |
|---|---|---|---|---|---|---|
| Ex. 1 | 9.84 | 46.3 | 227.8 | 91.78 | 1.29 | O |
| Ex. 2 | 9.65 | 37.4 | 252.1 | 92.12 | 1.11 | O |
| Ex. 3 | 9.88 | 28 | 187.9 | 92.12 | 1.01 | O |
| Ex. 4 | 9.92 | 30.2 | 506.4 | 90.46 | 2.30 | O |
| Ex. 5 | 11.3 | 26.4 | 124.2 | 91.90 | 0.49 | O |
| Ex. 6 | 11.7 | 23.1 | 102.9 | 90.60 | 0.72 | O |
| Ex. 7 | 9.89 | 24.5 | 184.5 | 92.32 | 1.01 | O |
| Comp. Ex. 1 | 6.62 | 22.7 | 526.0 | 89.24 | 1.91 | O |
| Comp. Ex. 2 | 10.4 | 7.2 | 379.0 | 89.32 | 3.41 | O |
| Comp. Ex. 3 | 9.50 | 8.7 | 515.4 | 90.98 | 1.42 | O |
| Comp. Ex. 4 | 8.91 | 13.5 | 568.8 | 89.39 | 3.17 | O |
| Comp. Ex. 5 | 9.22 | 21.1 | 11.5 | 91.87 | 0.87 | X |
| Comp. Ex. 6 | 9.29 | 20.8 | 98 | 90.05 | 1.27 | O |
| Comp. Ex. 7 | 10.5 | 5.1 | 173.6 | 0 | 45.2 | X |

TABLE 3

| | h (mm) | h' (mm) | d' (mm) | Expansion anisotropy |
|---|---|---|---|---|
| Ex. 1 | 0.083 | 0.833 | 46 | 3.3 |
| Ex. 2 | 0.114 | 0.915 | 48 | 2.5 |
| Ex. 3 | 0.072 | 0.453 | 41 | 2.3 |
| Ex. 4 | 0.260 | 1.488 | 47 | 1.8 |
| Ex. 5 | 0.192 | 1.066 | 49 | 1.7 |
| Ex. 6 | 0.194 | 1.028 | 53 | 1.5 |
| Ex. 7 | 0.086 | 0.423 | 39 | 1.9 |
| Comp. Ex. 1 | 0.434 | 1.387 | 49 | 1.0 |

TABLE 3-continued

| | h (mm) | h' (mm) | d' (mm) | Expansion anisotropy |
|---|---|---|---|---|
| Comp. Ex. 2 | 1.063 | 2.786 | 34 | 1.2 |
| Comp. Ex. 3 | 0.976 | 3.645 | 38 | 1.5 |
| Comp. Ex. 4 | 0.357 | 1.427 | 46 | 1.3 |
| Comp. Ex. 5 | 0.054 | 0.134 | 42 | 0.9 |
| Comp. Ex. 6 | 0.094 | 0.652 | 50 | 2.1 |
| Comp. Ex. 7 | 1.083 | 1.246 | 20 | 0.86 |

The super absorbent polymer film prepared in Examples was in the form of a film having high transparency and flexibility, and exhibited a shape different from that of the existing super absorbent polymer sheet. In addition, referring to Tables 2 and 3, it was confirmed that the super absorbent polymer film of Examples had a thinner thickness and better absorbency compared to the existing super absorbent polymer sheet while exhibiting high elongation and expansion anisotropy.

The invention claimed is:

1. A super absorbent polymer film, prepared by forming a monomer composition by mixing an acrylic acid-based monomer having at least partially neutralized acidic groups, a cellulose-based thickener, a moisturizing agent, a polymerization initiator, and a solvent; casting the monomer composition on a substrate to form a monomer composition film; forming a hydrogel polymer film by irradiating heat and/or light while drawing the monomer composition film; and drying the hydrogel polymer film, wherein the super absorbent polymer film has a thickness of 0.001 to 0.5 mm, a centrifugal retention capacity (CRC) of 23 g/g or more when measured in accordance with EDANA WSP 241.2, and an elongation of 100% or more calculated by Equation 1:

$$\text{Elongation } (\%) = (L_1 - L_0)/L_0 * 100 \qquad \text{[Equation 1]}$$

in Equation 1, $L_0$ is an initial gage length, and $L_1$ is a gage length at fracture when a specimen is pulled at a rate of 0.5 mm per minute.

2. The super absorbent polymer film of claim 1,
wherein the centrifugal retention capacity (CRC) is 23 g/g to 50 g/g, and the elongation is 100% to 550%.

3. The super absorbent polymer film of claim 1,
which has an expansion anisotropy of 1.5 or more represented by Equation 2, when the super absorbent polymer film cut into a circular shape is immersed in 0.9 wt % sodium chloride aqueous solution and swollen for 60 minutes, followed by measuring thicknesses and diameters, $$\text{Expansion anisotropy} = \frac{(h'/h)}{(d'/d)} \qquad \text{[Equation 2]}$$

in Equation 2, h is an initial thickness of the super absorbent polymer film, and h' is a thickness after swelling, and d is an initial diameter of the super absorbent polymer film, and d' is a diameter after swelling.

4. The super absorbent polymer film of claim 3,
wherein the expansion anisotropy is 1.5 to 5.

5. The super absorbent polymer film of claim 1,
which has a total light transmittance with respect to visible light is 89.5% or more.

6. The super absorbent polymer film of claim 1,
wherein the cellulose-based thickener is at least one selected from the group consisting of nanocellulose, hydroxyethylcellulose, hydroxypropylcellulose, hydroxyethylmethylcellulose, hydroxypropylmethylcellulose, and sodium carboxymethylcellulose.

7. The super absorbent polymer film of claim 1,
wherein the moisturizing agent is at least one selected from the group consisting of glycerin; diglycerin; ethylene glycol; propylene glycol; butylene glycol; sorbitol; polyethylene glycol; polyglycerin-3; polyglycerin-6; polyglycerin-10; an ester compound of polyglycerin-10 and a C3 to C18 saturated fatty acid; citric acid; triethyl citrate; methyl citrate; sodium citrate; and trisodium 2-methylcitrate.

8. The super absorbent polymer film of claim 1,
wherein the cellulose-based thickener is contained in an amount of 0.01 to 5 parts by weight based on 100 parts by weight of the solid content in the monomer composition.

9. The super absorbent polymer film of claim 1,
wherein the moisturizing agent is contained in an amount of 5 to 70 parts by weight based on 100 parts by weight of the acrylic acid-based monomer.

10. The super absorbent polymer film of claim 1,
wherein the monomer composition has a viscosity at 25° C. of 100 mPa·s or more.

11. The super absorbent polymer film of claim 1,
wherein tension applied to the monomer composition film in the step of forming the hydrogel polymer film is 40 to 100 N/m.

12. The super absorbent polymer film of claim 1,
which has a moisture content of 15% or less.

13. The super absorbent polymer film of claim 1,
which has a yellow index of 2.6 or less when measured in accordance with ASTM D1925.

14. The super absorbent polymer film of claim 1,
wherein the monomer composition film has a moisture content of 30 wt % to 60 wt %.

15. The super absorbent polymer film of claim 1,
wherein the monomer composition film has a thickness of 0.001 mm to 0.8 mm.

\* \* \* \* \*